US012533669B2

(12) United States Patent
Eymery et al.

(10) Patent No.: US 12,533,669 B2
(45) Date of Patent: Jan. 27, 2026

(54) FLEXIBLE TRUNK AND RIGID SUPPORT ARRANGEMENT FOR THE TRANSFER OF STERILE COMPONENTS FROM A CONTAINER

(71) Applicant: Becton Dickinson France, Le Pont-de-Claix (FR)

(72) Inventors: Anaïs Eymery, Saint-Georges-de-Commiers (FR); Clémentine Le Loc'h, Meylan (FR)

(73) Assignee: Becton Dickinson France, Le Pont-de-Claix (FR)

( * ) Notice: Subject to any disclaimer, the term of this patent is extended or adjusted under 35 U.S.C. 154(b) by 96 days.

(21) Appl. No.: 18/569,624

(22) PCT Filed: Jun. 17, 2022

(86) PCT No.: PCT/EP2022/066571
§ 371 (c)(1),
(2) Date: Dec. 13, 2023

(87) PCT Pub. No.: WO2022/263635
PCT Pub. Date: Dec. 22, 2022

(65) Prior Publication Data

US 2024/0278229 A1 Aug. 22, 2024

(30) Foreign Application Priority Data

Jun. 18, 2021 (EP) .................................... 21305840

(51) Int. Cl.
*B01L 1/02* (2006.01)

(52) U.S. Cl.
CPC ........... *B01L 1/02* (2013.01); *B01L 2300/123* (2013.01)

(58) Field of Classification Search
CPC ..... B01L 1/02; B01L 2300/123; B65B 7/2807
See application file for complete search history.

(56) References Cited

U.S. PATENT DOCUMENTS 4,974,393 A * 12/1990 Rich ...................... A63H 27/10 141/10
5,636,871 A * 6/1997 Field ...................... B65D 33/00 114/361
5,853,207 A 12/1998 Saint Martin et al.
6,357,488 B1 3/2002 Brossard et al.
(Continued)

FOREIGN PATENT DOCUMENTS

AU 2012216524 A1 9/2012
EP 1672265 A1 6/2006
JP 2001055207 A * 2/2001 ........... B65B 55/022

*Primary Examiner* — Bradley Duckworth
(74) *Attorney, Agent, or Firm* — The Webb Law Firm

(57) ABSTRACT

An assembly for the transfer of sterilized components from a container into a sterile chamber through a transfer port, the assembly including a rigid support (70) and a flexible trunk (80). The rigid support (70) is substantially annular and includes a first end (76), a second end (78), and a sealing surface (72) proximate the second end (78), wherein an outside diameter of the second end (78) is larger than an outside diameter of the first end (76). Additionally, the flexible trunk (80) is substantially tubular and includes a first end portion (82) and a second end portion (84), wherein the first end portion (82) is open and the second end portion (84) is coupled to the scaling surface (72) of the rigid support (70).

14 Claims, 10 Drawing Sheets

(56) References Cited

U.S. PATENT DOCUMENTS

| | | | | |
|---|---|---|---|---|
| 6,749,808 | B1 * | 6/2004 | Huynen .................... | A61L 2/26<br>422/26 |
| 7,282,176 | B2 * | 10/2007 | Glachet ..................... | B01L 1/02<br>422/26 |
| 8,523,436 | B2 | 9/2013 | Armau et al. | |
| 11,879,548 | B2 * | 1/2024 | Belin ....................... | F16J 15/32 |
| 2012/0117920 | A1 * | 5/2012 | Mermet ................ | A61M 5/002<br>220/660 |
| 2018/0369801 | A1 * | 12/2018 | Pallares .................... | B01L 1/02 |
| 2019/0274922 | A1 | 9/2019 | Mendyk | |

* cited by examiner

FLEXIBLE TRUNK AND RIGID SUPPORT ARRANGEMENT FOR THE TRANSFER OF STERILE COMPONENTS FROM A CONTAINER

CROSS-REFERENCE TO RELATED APPLICATIONS

This application is the United States national phase of International Application No. PCT/EP2022/066571 filed Jun. 17, 2022, and claims priority to European Application No. 21305840.7, entitled "Flexible Trunk and Rigid Support Arrangement for the Transfer of Sterile Components from a Container", filed Jun. 18, 2021, the entire disclosures of which are hereby incorporated by reference in their entirety.

BACKGROUND

Field of the Disclosure

The present disclosure relates generally to the packaging and transfer of sterile components used in, e.g., medical devices. More particularly, the present disclosure relates to flexible trunk and rigid support arrangements used in conjunction with a container (i.e., a bag) for the transfer of sterilized components (e.g., plunger stoppers) from the container into a sterile biopharmaceutical chamber.

Description of the Related Art

As is known in the art, transfer or storage devices for delivery of a medicament, drug, or vaccine (such as, e.g., syringes) utilize a plunger stopper in contact with an inside surface of a generally tubular syringe barrel in order to draw a substance into (or expel a substance from) the device by way of a plunger rod.

Currently, many such devices are filled and assembled using automated filling machines. Not only do such machines improve productivity and accuracy, but they also provide for a substantially sterile and aseptic filling environment. The various components of the devices (e.g., plunger stoppers, syringe barrels, etc.) are separately provided within the filling machines to enable at least some level of automated assembly.

Generally, a plurality of plunger stoppers are initially provided in a substantially flexible bag or similar container to be accessed by the filling machine prior to assembly. The bag and its contents are sterilized via, e.g., gamma irradiation, steam, etc. In this way, the plunger stoppers, are able to be directly transferred from a first sterile environment (i.e., the sterilized bag) to a second sterile environment (i.e., the sterile filling machine).

Referring to FIGS. 1A-1C, an example of such a transfer arrangement according to the prior art is illustrated. As shown in FIG. 1A, the biopharmaceutical system 10 is configured as an "inside open" system, wherein a transfer port 12 located in a sidewall of the system 10 includes a sealed door 14 openable from the inside via a rotatable handle 16. The handle 16 is accessible to an operator by way of an integrated glove 18 extending from an opening 20 in another sidewall of the system 10. In this way, the door 14 itself remains in a sterile environment throughout opening and closing processes, mitigating the opportunities for contamination within the system 10.

While not shown in FIGS. 1A-1C, prior to the door 14 being opened to begin the transfer of sterilized components into the system 10, a bag containing the sterilized components is affixed to the exterior-facing portion of transfer port 12 by way of, e.g., a magnetic connector, a twist-lock connector, etc. An access lid (or door) on the bag is coupled to the door 14 when the bag is affixed to the transfer port 12, thereby allowing the bag's lid to be removed simultaneously with the opening of the door 14 of the system 10. In this way, the sterilized components within the bag may be transferred into the system 10 without being exposed to external air or surfaces, which could lead to contamination.

However, despite this configuration, the transfer port 12 may include a portion, known generally as the "critical zone" or "ring of concern", that may possibly become exposed to outside contaminants prior to the component transfer process. Referring to FIG. 1B, before the connection of the bag to the transfer port 12, the "ring of concern" (i.e., ring 24) may make contact with the ambient atmosphere, which could lead to contamination of the bag's contents during transfer. Accordingly, in order to avoid such contamination, transfer bags have been developed which include an outer bag and an inner bag, wherein the inner bag is configured to function as an extendable sleeve to protect the components from the ring 24 during transfer, as well as to better direct the components to a desired location within the system 10. An example of such a bag is shown and described in U.S. Patent Application Publication No. 2019/0274922. Referring to FIG. 1B, when the door 14 is opened, the inner bag 22 may be accessed by the operator and pulled through the transfer port 12, thus covering the ring 24. As shown in FIG. 1C, after the inner bag 22 has been fully extended, the components 26 (e.g., plunger stoppers) may be directed to a container 28 such as a vibrating bowl within the system 10, thereby bypassing the ring 24.

While transfer bags such as those described in U.S. Patent Application Publication No. 2019/0274922 are effective at both avoiding potentially contaminated surfaces during component transfer and aiding in the direction of components to, e.g., a container within the system, such bags are typically complicated and expensive to manufacture. Such a construction requires complex welds between the inner bag and the interior of the outer bag. Thus, in order to overcome these disadvantages, alternative transfer bags have been devised. One such bag configuration incorporates a rigid ring located at or near the removable lid of the bag, wherein the rigid ring remains within the bag (and, thus, sterile) until the lid is removed. Once the bag is coupled to the transfer port, the rigid ring is capable of being pressed or otherwise moved out of the bag so as to effectively cover the "critical zone" or "ring of concern" of the transfer port, protecting the components from coming into contact with this potentially contaminated ring surface. Such a bag configuration may also be usable with systems having an "inside open" configuration (as shown in FIGS. 1A-1C) or an "outside open" configuration, where the transfer port's door is accessed and opened by the operator from the outside of the system.

However, while the transfer bags described above may avoid the disadvantages of those shown and described in U.S. Patent Application Publication No. 2019/0274922 with respect to manufacturing complexity, cost, etc., those transfer bags incorporating only a rigid ring do not include a sleeve or other feature to aid in guiding the components to a container within the system. In many instances, the guiding of components from the transfer port opening to the container is desirable, and perhaps even necessary.

SUMMARY

In view of the foregoing, there exists a need for a flexible trunk and rigid support configuration to be utilized in conjunction with a transfer bag in order to aid in the transfer of components from the transfer port to the container within a sterile and aseptic biopharmaceutical chamber.

Embodiments of the present disclosure are directed to an assembly for the transfer of sterilized components from a container into a sterile chamber through a transfer port. The assembly includes a rigid support and a flexible trunk. The rigid support is substantially annular and includes a first end, a second end, and a sealing surface proximate the second end. An outside diameter of the second end is larger than an outside diameter of the first end. Also, the flexible trunk is substantially tubular and includes a first end portion and a second end portion, wherein the first end portion is open and the second end portion is coupled to the sealing surface of the rigid support.

In some embodiments, the rigid support is configured to be selectively and slidably engaged with an interior surface wall of a connector of a transfer container configured to hold a plurality of sterilized components therein.

In some embodiments, the flexible trunk is configured to be selectively expanded from a first position on a first side of the connector and within a flexible bag of the transfer container to a second position on a second side of the connector and outside of the flexible bag of the transfer container.

In some embodiments, an outer surface of the rigid support includes a plurality of ribs extending longitudinally between the first end and the second end.

In some embodiments, the outside diameter of the second end of the rigid support is less than or equal to an outside diameter of an annular neck of the connector.

In some embodiments, the second end portion of the flexible trunk is coupled to the sealing surface of the rigid support by one of a rotational seal, a snap-fit connection, or a rigid ring extending over the second end portion of the trunk.

In some embodiments, the rotational seal between the second end portion and the sealing surface is formed by one of thermal sealing or adhesive sealing.

In some embodiments, the rigid support is formed of a material suitable for sterilization, such as steam sterilization, gamma sterilization, or ethylene oxide sterilization.

In some embodiments, the rigid support is formed of one of polycarbonate (PC), acrylonitrile butadiene styrene (ABS), polyvinylidene fluoride (PVDF), or polybutylene terephthalate (PBT).

In some embodiments, the flexible trunk is formed of a material suitable for sterilization, such as steam sterilization, gamma sterilization, or ethylene oxide sterilization.

In some embodiments, the flexible trunk is formed of one of polyethylene (PE), high-density polyethylene (HDPE), thermoplastic elastomer (TPE), polypropylene (PP), polyamide (PA), or polyvinylidene fluoride (PVDF).

In some embodiments, the flexible trunk is at least one of foldable or rollable relative to the rigid support.

In some embodiments, a length of the flexible trunk from the first end portion to the second end portion is between 35-60 cm.

In some embodiments, the flexible trunk is configured to expand from a first, stowed arrangement relative to a first side of the rigid support to a second, elongated arrangement relative to a second side of the rigid support.

In some embodiments, the flexible trunk is configured to pass through the rigid support when expanding from the first, stowed arrangement to the second, elongated arrangement.

Further details and advantages of the present disclosure will be understood from the following detailed description read in conjunction with the accompanying drawings.

DESCRIPTION OF THE INVENTION

Figure 1A:
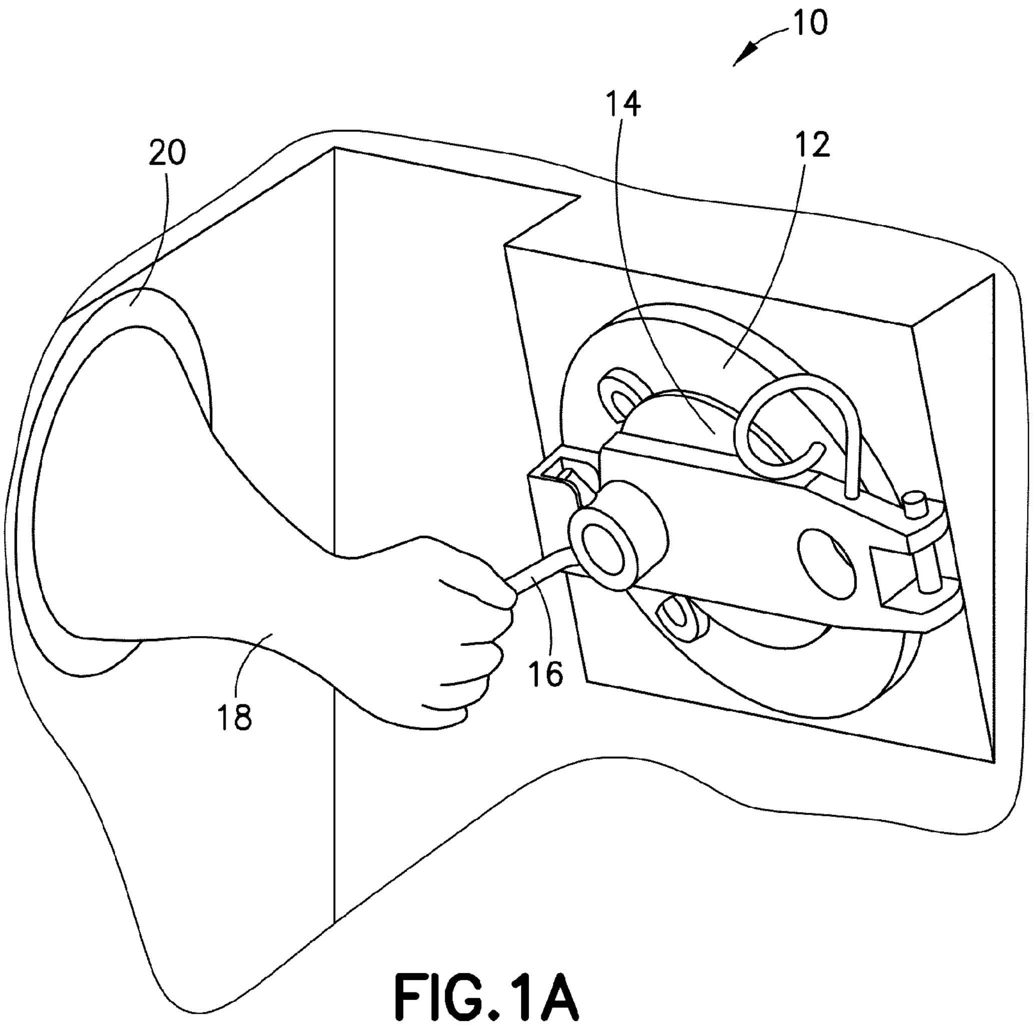
FIG. 1A PRIOR ART
FIG. 1A is a partial interior view of a transfer port configuration for a sterile chamber in a first position according to the prior art.
Figure 1B:
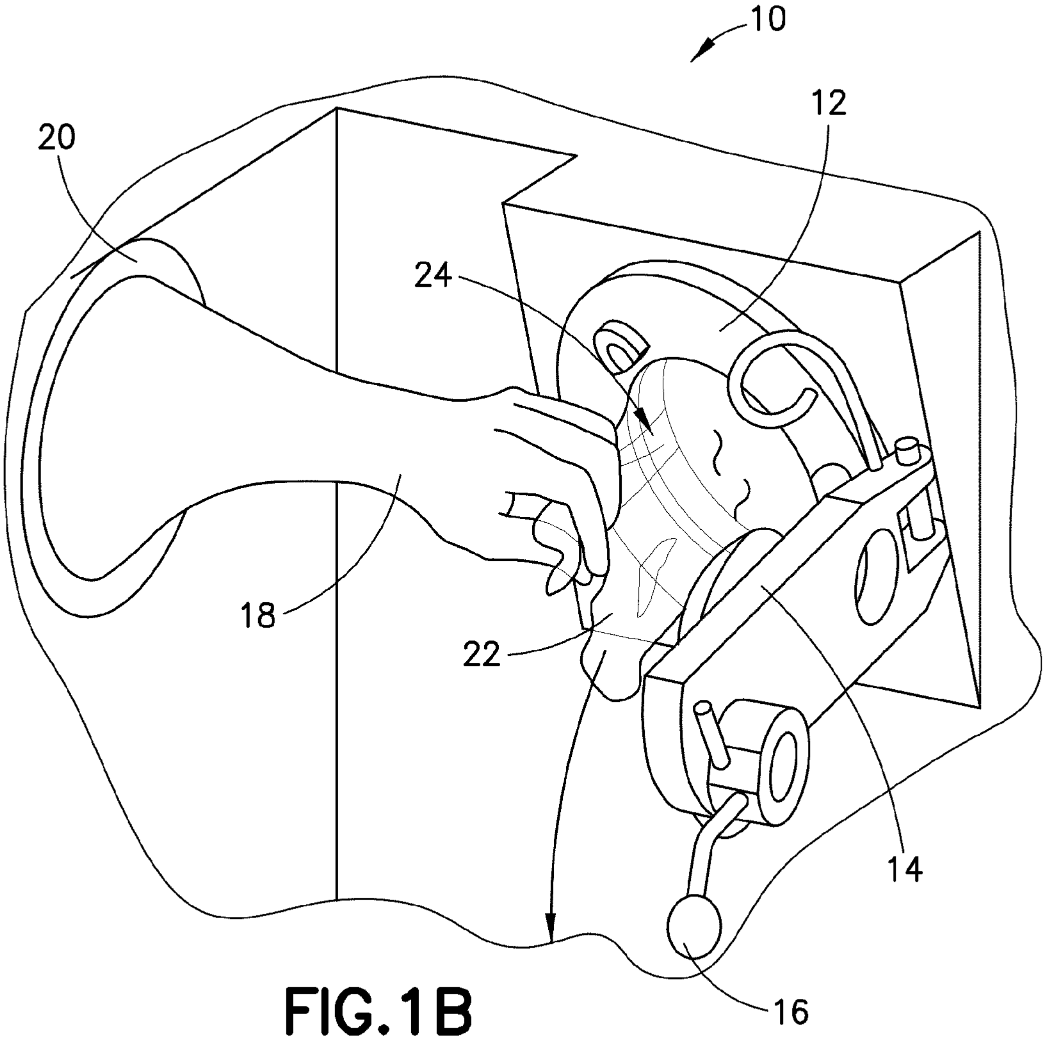
FIG.1B PRIOR ART
FIG. 1B is a partial interior view of the transfer port configuration of FIG. 1A in a second position according to the prior art.
Figure 1C:
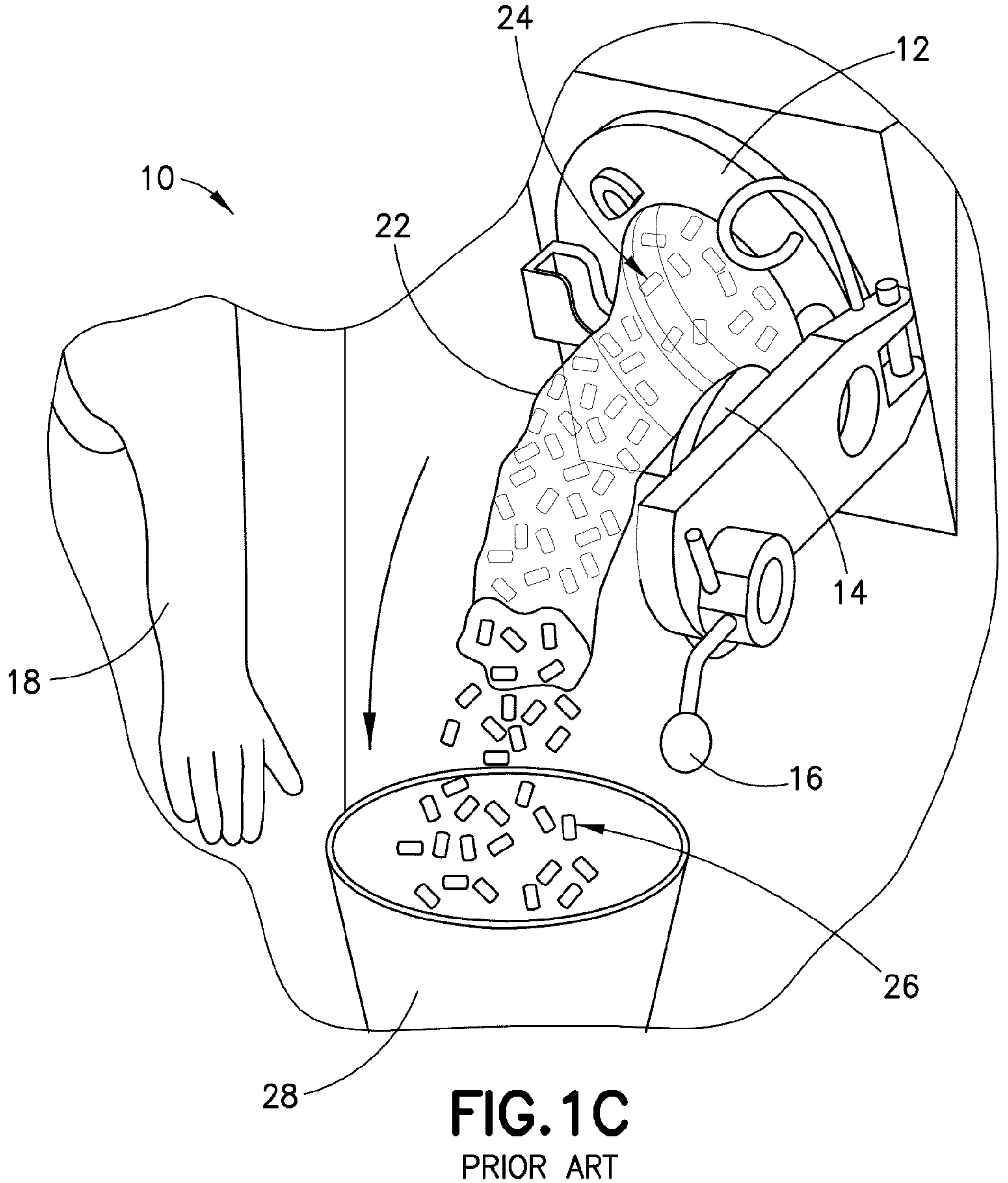
FIG. 1C PRIOR ART
FIG. 1C is a partial interior view of the transfer port configuration of FIG. 1A in a third position according to the prior art.

The following description is provided to enable those skilled in the art to make and use the described aspects contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For the purposes of the description hereinafter, the terms "upper", "lower", "right", "left", "vertical", "horizontal", "top", "bottom", "lateral", "longitudinal", and derivatives thereof shall relate to the invention as it is oriented in the drawings. However, it is to be understood that the invention may assume various alternative variations, except where expressly specified to the contrary. It is also to be understood that the specific devices illustrated in the attached drawings, and described in the following specification, are simply exemplary aspects of the invention. Hence, specific dimensions and other physical characteristics related to the aspects disclosed herein are not to be considered as limiting.

Figure 2:
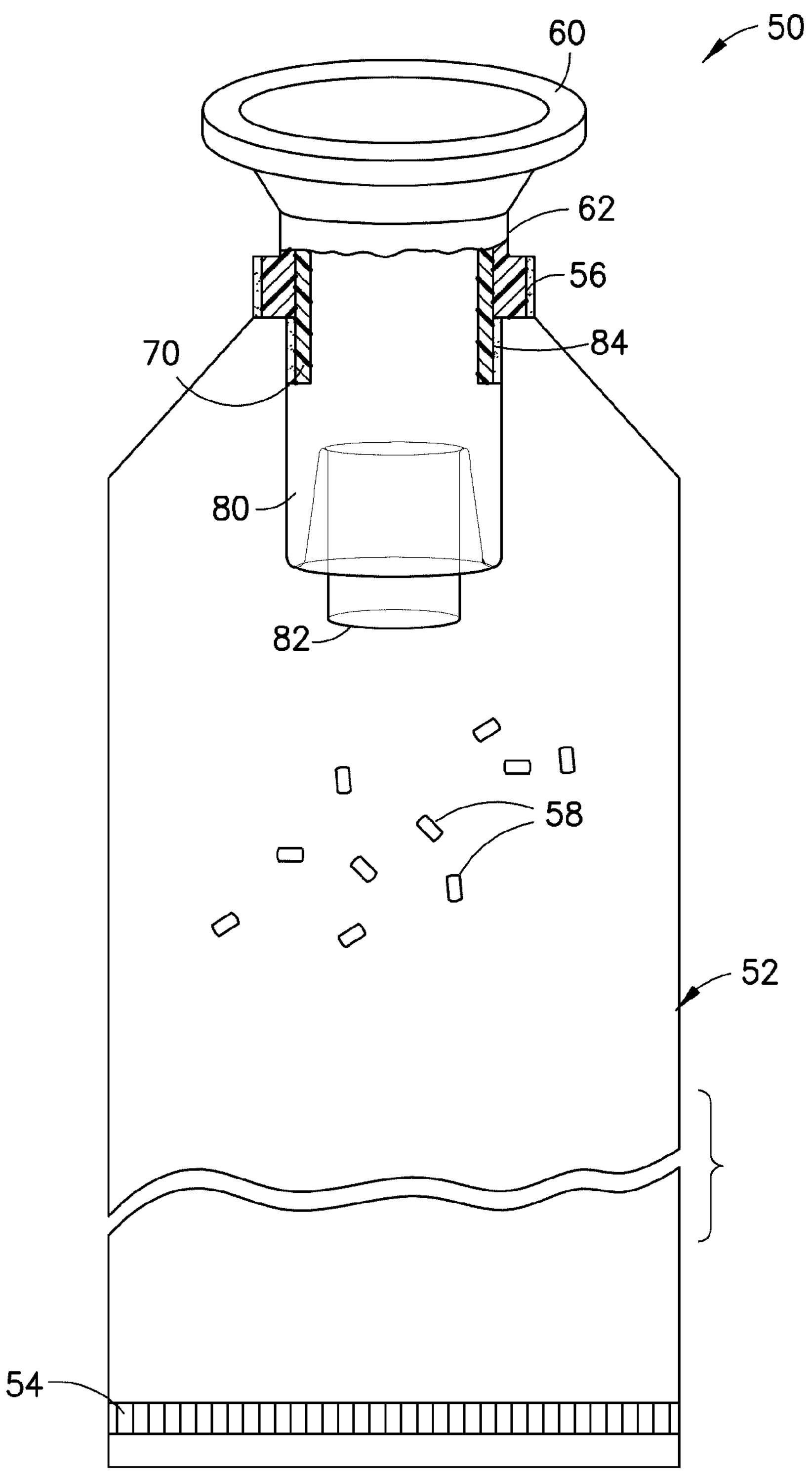
FIG. 2 is a side view of a transfer bag configuration incorporating a rigid support and flexible trunk in accordance with an aspect of the present disclosure.
Figure 3:
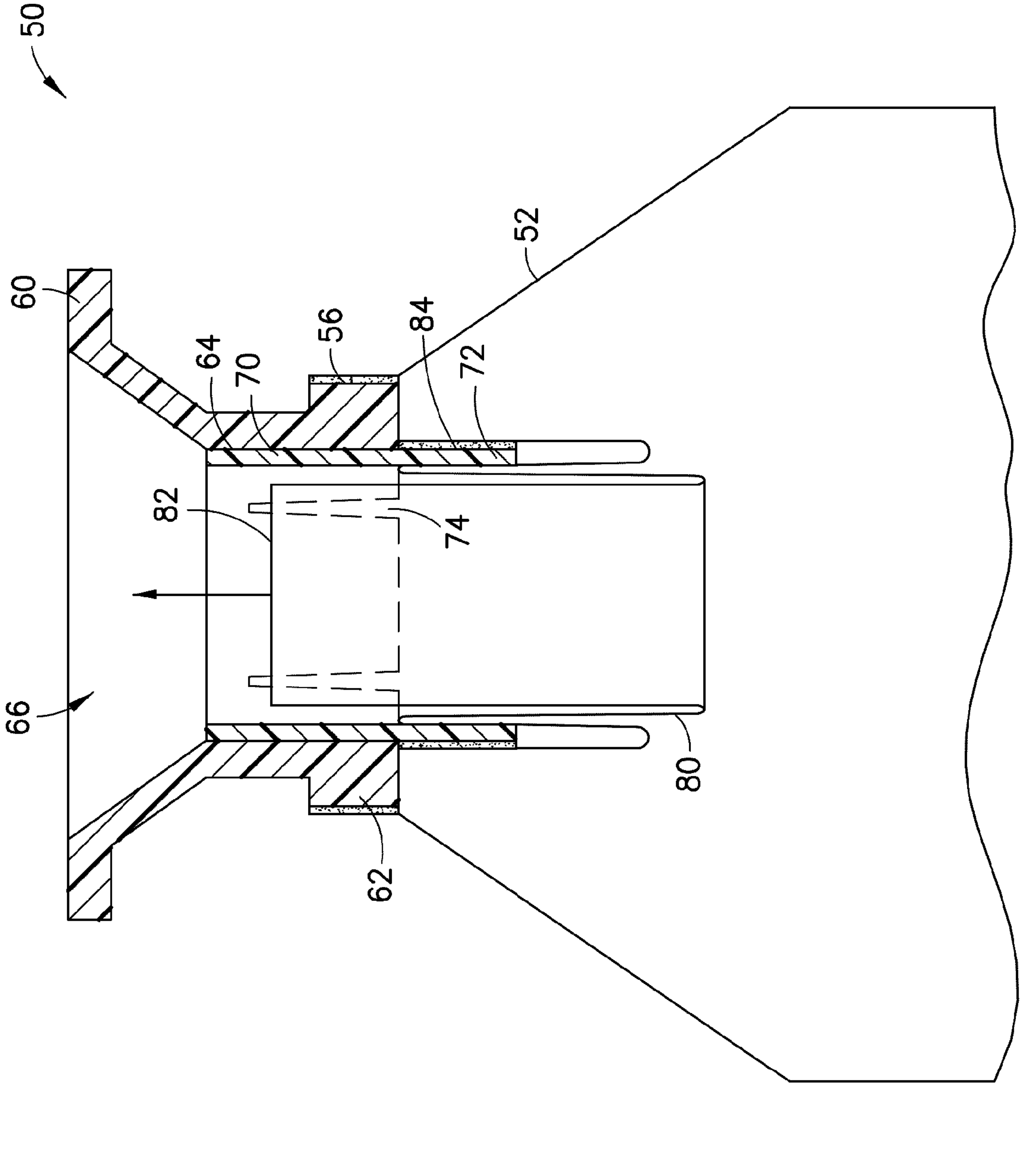
FIG. 3 is a partial cross-sectional view of the transfer bag configuration, rigid support, and flexible trunk of FIG. 2.
Figure 4:
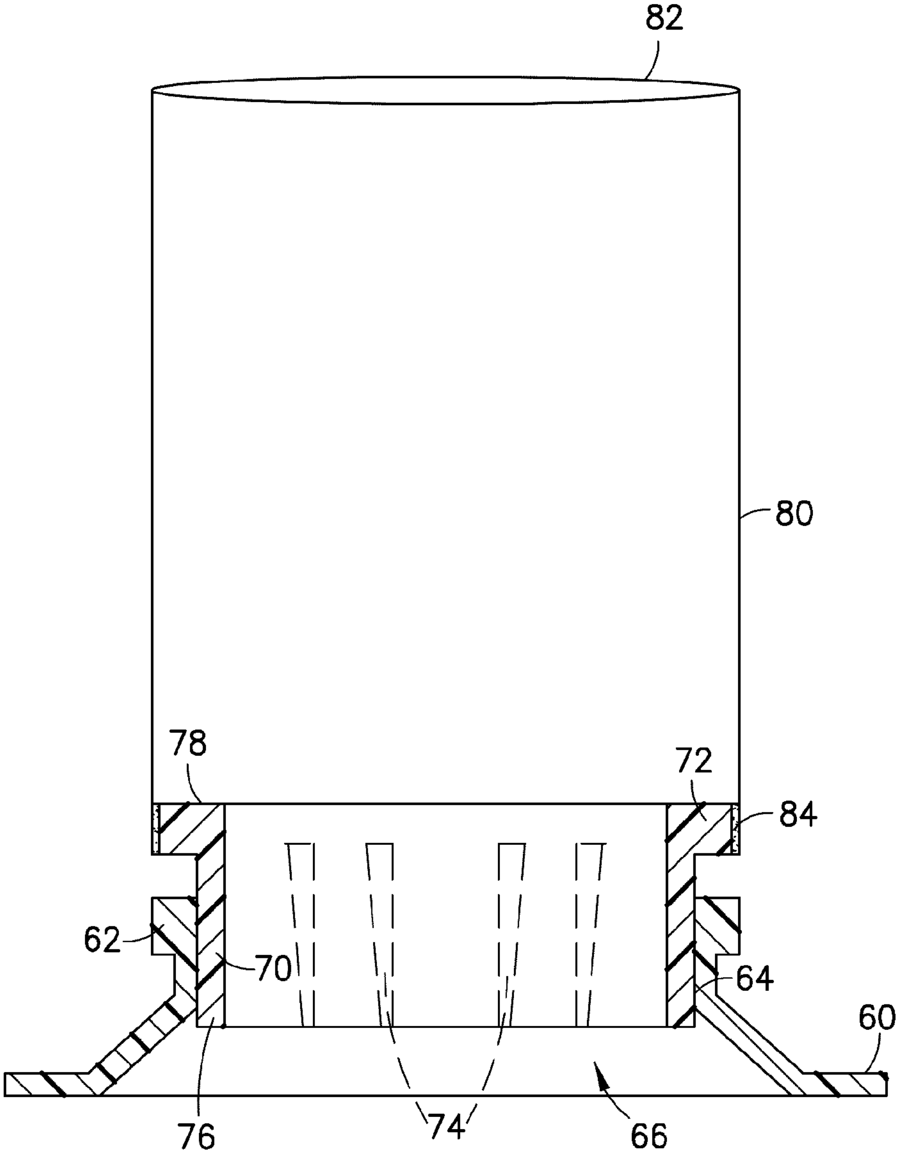
FIG. 4 is a cross-sectional view of the rigid support and flexible trunk in a first position in accordance with an aspect of the present disclosure.

Referring to FIGS. 2 and 3, a component transfer container 50 in accordance with an aspect of the present disclosure is shown. The transfer container 50 includes a flexible primary bag 52 having a distal end 54 and a proximal end 56. The distal end 54 is closed, while the proximal end 56 is open, preferably in the form of an annular opening. As shown in FIG. 2, in some embodiments, the flexible primary bag 52 may taper toward the proximal end 56 in the form of, e.g., a bottleneck. The flexible primary bag 52 may be formed of any appropriate flexible material suitable for steam sterilization, gamma sterilization, or ethylene oxide sterilization. Examples of such a flexible material may be, e.g., polyethylene (PE), high-density polyethylene (HDPE), thermoplastic elastomer (TPE), polypropylene, polyvinylidene fluoride (PVDF), etc. Additionally, the flexible primary bag 52 is sized and configured to hold a plurality of sterilized components 58 therein, such as, e.g., a plurality of plunger stoppers, a plurality of needle covers, a plurality of tip caps, etc.

Referring still to FIG. 2, transfer container 50 further includes a connector 60. Connector 60 may be formed of any appropriate rigid material suitable for steam sterilization, gamma sterilization, or ethylene oxide sterilization, such as, e.g., polycarbonate (PC), acrylonitrile butadiene styrene (ABS), polyvinylidene fluoride (PVDF), polybutylene terephthalate (PBT), etc. The connector 60 is configured to support the locking forces against the door of a transfer portal of a sterile chamber, as described above. In the embodiment shown in FIG. 2, the connector 60 includes a distal end configured for a twist-lock connection to the transfer portal. However, it is to be understood that connector 60 may be configured for other forms of connection to the transfer portal and/or door such as, e.g., a magnetic connection.

As shown in FIGS. 2 and 3, a proximal portion of connector 60 includes an annular neck 62. The proximal end 56 of flexible bag 52 is affixed to the annular neck 62 by way of a rotational seal. Any appropriate method of sealing such as, e.g., heat sealing, adhesive sealing, etc., may be utilized in forming the rotational seal between proximal end 56 and annular neck 62. In this way, the contents of flexible bag 52 (i.e., components 58) may be funneled through an opening 66 formed in connector 60 when the transfer container 50 is coupled to a transfer port.

Referring still to FIGS. 2 and 3, and also to FIGS. 4-6C, the transfer container 50 further includes a rigid support 70 and a flexible trunk 80. As will be described in further detail below, the flexible trunk 80 is coupled to the rigid support 70 by way of a rotational seal (e.g., a heat seal, adhesive seal, etc.). Furthermore, the rigid support 70 is configured to be slidably engageable with an interior surface wall 64 of the connector 60. In this way, the rigid support 70 and the flexible trunk 80 may be selectively coupled to the connector 60 during manufacture of the transfer container 50 such that flexible trunk 80 provides both guidance of components from the transfer port to a container and protection from the potentially contaminated "critical zone" or "ring of concern" of the transfer port.

The rigid support 70 may be formed of any appropriate rigid material such as, e.g., polycarbonate (PC), acrylonitrile butadiene styrene (ABS), polyvinylidene fluoride (PVDF), polybutylene terephthalate (PBT), etc. The rigid support 70 is annular in shape and includes a first end 76 and a second end 78. Proximate the second end 78 is a sealing surface 72, wherein sealing surface 72 is configured to provide an adequate surface for at least partial rotational attachment of the flexible trunk 80 thereon. It is to be understood that the connection between the flexible trunk 80 and the sealing surface 72 need not be a complete seal around the full circumference of the rigid support 70. In some embodiments, the outside diameter of sealing surface 72 may be less than or substantially the same as the outside diameter of the annular neck 62 of the connector 60, while the outside diameter of the remaining portions of rigid support 70 is substantially the same as (or slightly smaller than) the inside diameter of the interior surface wall 64 of the connector 60. In this way, the rigid support 70 may be coupled to the connector 60 via, e.g., a press-fit connection, but travel of the rigid support 70 relative to the interior surface wall 64 is limited due to the diameter of the sealing surface 72 relative to the annular neck 62.

As shown in FIGS. 3-6C, in some embodiments, the annular outer sidewall of rigid support 70 may further include a plurality of longitudinally-extending ribs 74. These ribs 74 may aid in the press-fit connection between the rigid support 70 and the connector 60. In some embodiments, connection between the rigid support 70 and the connector 60 may be limited to an interference (or press) fit. However, in other embodiments, connection between the rigid support 70 and the connector 60 may include, for example, an adhesive to more fixedly couple the rigid support 70 and the connector 60.

Referring again to FIGS. 2-6C, the flexible trunk 80 includes a first end portion 82 and a second end portion 84. First end portion 82 is configured to include an annular opening, and remains free (i.e., unattached) to any other component of the transfer container 50. Conversely, the second end portion 84 is also substantially annular but is configured to be coupled to the sealing surface 72 of rigid support 70 by way of, e.g., rotational sealing, a snap-fit connection, a separate rigid ring extending over the second end portion 84 of the flexible trunk 80, etc. In this way, once coupled, the rigid support 70 and flexible trunk 80 form a single component capable of selective engagement with the connector 60 within a flexible bag 52. Flexible trunk 80 may be formed of any appropriate flexible material suitable for steam sterilization, gamma sterilization, or ethylene oxide sterilization. Examples of such a flexible material may be, e.g., polyethylene (PE), high-density polyethylene (HDPE), thermoplastic elastomer (TPE), polypropylene (PP), polyamide (PA), polyvinylidene fluoride (PVDF), etc.

Additionally, in some embodiments, the flexible trunk 80 is substantially tubular in shape. However, it is to be understood that flexible trunk 80 is not limited to such a tubular shape, and the diameters of first end portion 82, second end portion 84, and/or any other portion of flexible trunk 80 may vary. Furthermore, flexible trunk 80 may be provided in varying lengths based on application, customer needs, etc. For example, flexible trunk 80 may have a length between 35-60 cm, and, in some embodiments, is preferably between 40-55 cm. However, it is to be understood that flexible trunk 80 is not limited to such a length range, and may be longer or shorter.

Figure 5:
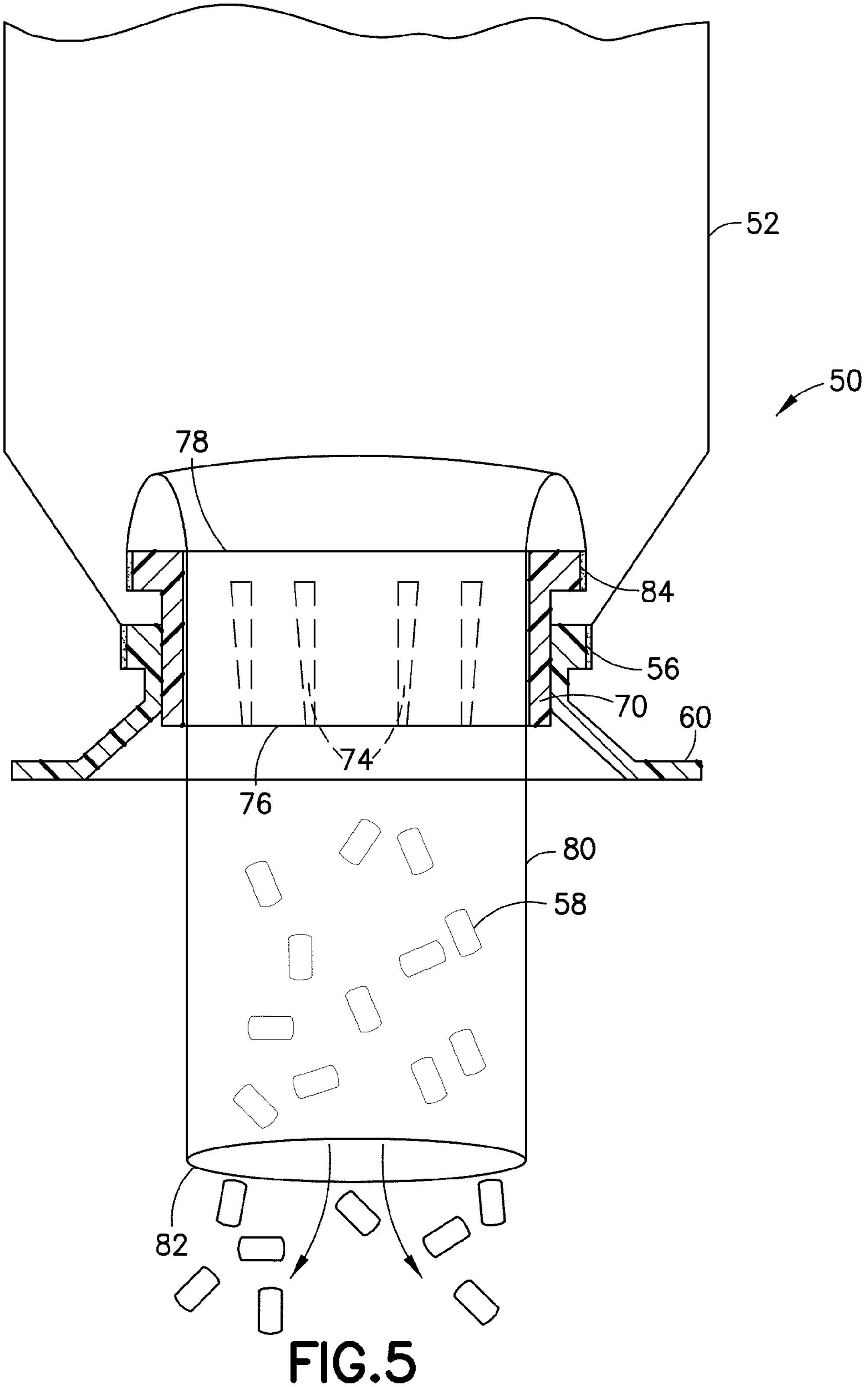
FIG. 5 is a side view of the transfer bag configuration, rigid support, and flexible trunk in a second position in accordance with an aspect of the present disclosure.
Figure 6A:
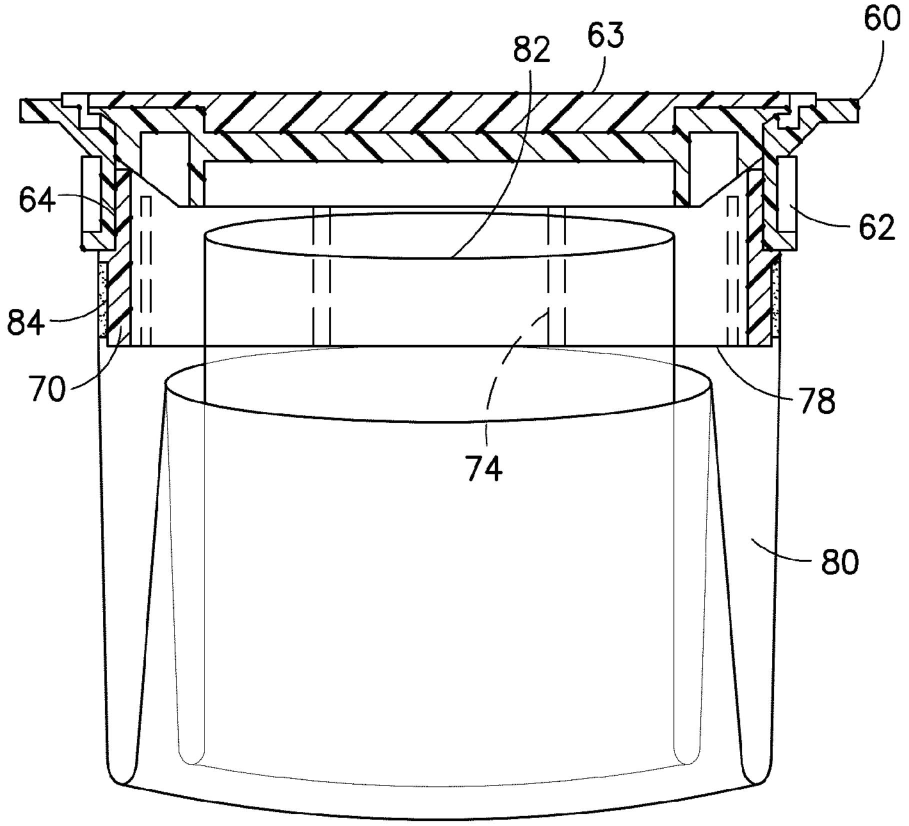
FIG. 6A is a side view of a connector portion, rigid support, and flexible trunk in a first position in accordance with an aspect of the present disclosure.
Figure 6B:
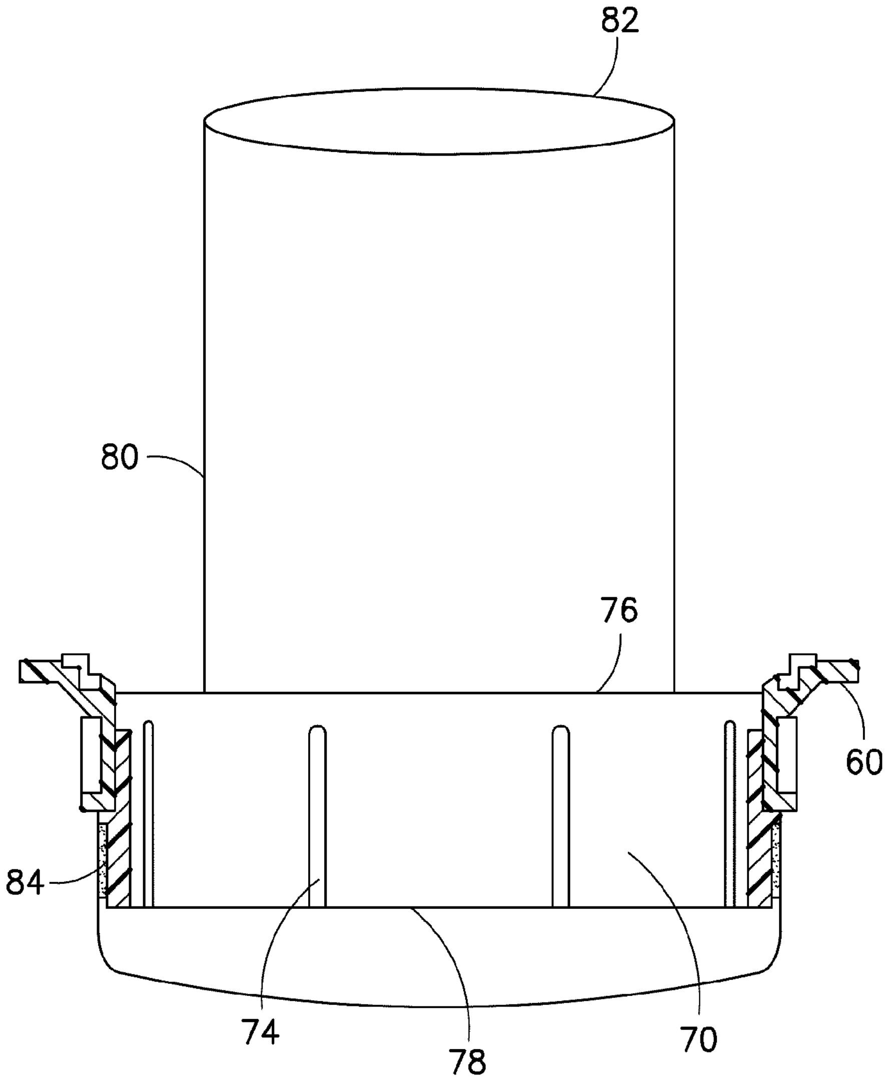
FIG. 6B is a side view of the connector portion, rigid support, and flexible trunk of FIG. 6A in a second position.
Figure 6C:
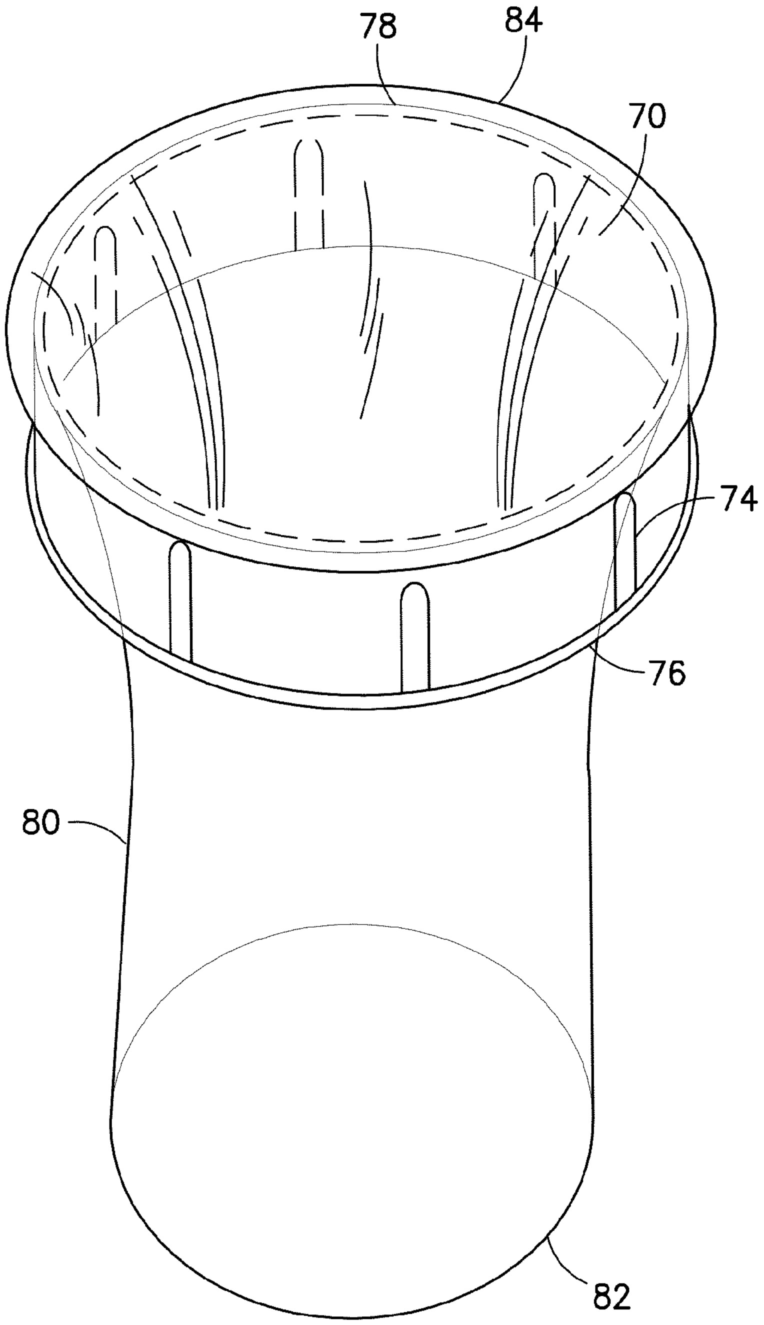
FIG. 6C is a perspective view of the connector portion, rigid support, and flexible trunk of FIG. 6B in the second position.

FIG. 6A illustrates the rigid support 70 and flexible trunk 80 coupled to the connector 60 in a pre-use configuration. For clarity of illustration, the flexible bag 52 has been omitted from FIG. 6A, but it is to be understood that a flexible bag 52 surrounds the flexible trunk 80 and is coupled to the connector 60 by way of, e.g., a rotational seal, as is shown in FIGS. 2, 3, and 5. In the pre-use configuration, the flexible trunk 80 is folded, rolled, or otherwise stowed within the flexible bag (not shown) behind a door 63 of the connector 60. Then, when the connector 60 is coupled to a transfer port as described above, the door 63 is opened or removed, thereby exposing the interior of the flexible bag to the transfer port and interior of the sterilized chamber. In this configuration, the flexible trunk 80 can be unfolded or unrolled so as to be fed through the annular openings of the rigid support 70 and connector 60, as is shown in FIGS. 5, 6B, and 6C. Feeding of the flexible trunk 80 in this way may be accomplished by any appropriate means, such as e.g., pulling, pushing, gravity, etc. Once fully expanded, the first end portion 82 of the flexible trunk 80 extends substantially beyond the connector 60, thereby allowing any components 58 exiting the flexible bag 52 to be guided to a container (e.g., a vibrating bowl) or other area within a sterile chamber, as is shown in FIG. 5. Furthermore, the flexible trunk 80 also provides protection from contact between the components 58 passing therethrough and the "critical zone" or "ring of concern" of the transfer port to which the transfer container is attached.

As described above, the coupled rigid support 70 and flexible trunk 80 need not be permanently attached to the connector 60 within the flexible bag 52, and may be included only on a case-by-case basis during the manufacture of the transfer container 50. In this way, the complicated manufacturing process of forming a container having an integrated inner and outer bag according to the prior art can be avoided, while still providing an option (or various options) for the guidance of components from the transfer port opening to a container, if needed or desired.

In the embodiments described above with respect to FIGS. 2-6C, the rigid support and flexible trunk are separate components coupled together by way of, e.g., rotational sealing, a snap-fit connection, a separate rigid ring extending over an end portion of the flexible trunk, etc. In this way, the rigid support and flexible trunk may be made of different materials using different manufacturing processes. However, in an alternative embodiment, it is to be understood that the rigid support and flexible trunk may be co-molded or over-molded as a single, unitary piece avoiding additional assembly steps. With another alternative embodiment, the rigid support and flexible trunk can be formed of the same overall material as a unitary piece, but the material would have different thicknesses so as to retain the needed rigidity of the rigid support and flexibility of the flexible trunk. That is, the material thickness of the flexible trunk would be substantially lower than the material thickness of the rigid support. Examples of materials suitable for unitarily forming both the flexible trunk and the rigid support in this way are, e.g., silicone or thermoplastic elastomer (TPE).

While several embodiments of transfer containers and component transfer arrangements are shown in the accompanying figures and described hereinabove in detail, other embodiments will be apparent to, and readily made by, those skilled in the art without departing from the scope of the invention. For example, it is to be understood that this disclosure contemplates, to the extent possible, that one or more features of any embodiment can be combined with one or more features of any other embodiment. Accordingly, the foregoing description is intended to be illustrative rather than restrictive.

What is claimed is:

1. A transfer container for the transfer of sterilized components into a sterile chamber through a transfer port, the transfer container comprising:

a flexible bag having a distal end and a proximal end, a connector coupled to the proximal end of the flexible bag and configured to engage a transfer portal or door of the sterile chamber, the connector comprising an interior surface wall, a rigid support selectively engaged with the interior surface wall; and a flexible trunk, wherein the rigid support is substantially annular and includes a first end, a second end, and a sealing surface proximate the second end, wherein an outside diameter of the second end is larger than an outside diameter of the first end, wherein the flexible trunk is substantially tubular and includes a first end portion and a second end portion, wherein the first end portion is open and the second end portion is coupled to the sealing surface of the rigid support, and wherein the flexible trunk is selectively expandible from a first position on a first side of the connector and within the flexible bag of the transfer container to a second position on a second side of the connector and outside of the flexible bag of the transfer container.

2. The transfer container according to claim 1, wherein the rigid support is slidably engaged with the interior surface wall of the connector.

3. The transfer container according to claim 1, wherein an outer surface of the rigid support comprises a plurality of ribs extending longitudinally between the first end and the second end.

4. The transfer container according to claim 1, wherein the outside diameter of the second end of the rigid support is less than or equal to an outside diameter of an annular neck of the connector.

5. The transfer container according to claim 1, wherein the second end portion of the flexible trunk is coupled to the sealing surface of the rigid support by one of a rotational seal, a snap-fit connection, or a rigid ring extending over the second end portion of the trunk.

6. The transfer container according to claim 5, wherein the rotational seal between the second end portion and the sealing surface is formed by one of thermal sealing or adhesive sealing.

7. The transfer container according to claim 1, wherein the rigid support is formed of a material suitable for at least one of steam sterilization, gamma sterilization, ethylene oxide sterilization, or any combination thereof.

8. The transfer container according to claim 7, wherein the rigid support is formed of one of polycarbonate (PC), acrylonitrile butadiene styrene (ABS), polyvinylidene fluoride (PVDF), or polybutylene terephthalate (PBT).

9. The transfer container according to claim 1, wherein the flexible trunk is formed of a material suitable for at least one of steam sterilization, gamma sterilization, ethylene oxide sterilization, or any combination thereof.

10. The transfer container according to claim 9, wherein the flexible trunk is formed of one of polyethylene (PE), high-density polyethylene (HDPE), thermoplastic elastomer (TPE), polypropylene (PP), polyamide (PA), or polyvinylidene fluoride (PVDF).

11. The transfer container according to claim 1, wherein the flexible trunk is at least one of foldable or rollable relative to the rigid support.

12. The transfer container according to claim 1, wherein a length of the flexible trunk from the first end portion to the second end portion is between 35-60 cm.

13. The transfer container according to claim 1, wherein the flexible trunk is configured to expand from a first, stowed arrangement relative to a first side of the rigid support to a second, elongated arrangement relative to a second side of the rigid support.

14. The transfer container according to claim 13, wherein the flexible trunk is configured to pass through the rigid support when expanding from the first, stowed arrangement to the second, elongated arrangement.

* * * * *